Patented Jan. 15, 1952

2,582,708

UNITED STATES PATENT OFFICE 2,582,708

LUBRICATING OIL ADDITIVES

Samuel B. Lippincott, Westfield, N. J., and Alexander H. Popkin, New York, N. Y., assignors to Standard Oil Development Company, a corporation of Delaware No Drawing. Application October 1, 1948, Serial No. 52,418

6 Claims. (Cl. 252—56)

This invention relates to novel chemical products and to processes for preparing and using the same. It relates also to the use of said products as lubricating oil additives. More particularly, it relates to modified high molecular weight copolymers of an unsaturated dibasic acid or its derivatives with the monoxides of diolefins, and to the condensate of an unsaturated dibasic acid or its derivatives with the reaction product of a diolefin monoxide and an alcohol, an amine, or a mercaptan.

For these products to be active as pour point depressants in mineral lubricating oils it is essential that the copolymer carry side groups made up of long hydrocarbon chains containing from eight to twenty-four atoms. In the case of a copolymer modified by esterification, amidation and the like a long chain is generally supplied by the modification agent which may be an alcohol, a mercaptan or an amine. Where the product consists of the condensate of the dibasic acid derivative and a diolefin monoxide reaction product with an alcohol, an amine, or a mercaptan, the long chain is generally supplied by the reactant with the monoxide. These novel polymeric materials are especially useful for improving the pour point, viscosity index, and other properties of mineral lubricating oils, and they may be used in conjunction with other lubricating oil additives.

One object of the present invention is the production of pour depressants of high potency in a wide variety of lubricating oils. A further object is the production of a lubricating oil additive which not only lowers the pour point, but also increases the viscosity index of the oil, so that the additive is not only a good pour depressant when used in small amounts but will also be an effective pour depressant when used in higher concentrations as a viscosity index improver.

Broadly, the present invention comprises the production of oil-soluble polymeric materials obtained by reacting an ethylene-1,2-dicarboxylic acid or derivative with a diolefin monoxide and modifying by further reaction with an alcohol, amine, mercaptan or fatty acid or, by reacting an ethylene-1,2-dicarboxylic acid or derivative with the reaction product of a diolefin monoxide and an alcohol, amine, mercaptan or fatty acid. It is known to the art to copolymerize ethylene-1,2-dicarboxylic acid and derivatives with compounds containing olefinic linkages. It is also known that these copolymers may be modified by esterification, amidation, imidation, and the like, the modification generally supplying the essential long hydrocarbon side chains necessary for solubility and effective lowering of the pour point of a waxy mineral lubricating oil. It has now been found that ethylene-1,2-dicarboxylic acid and derivatives may be reacted with diolefin monoxides, either directly or with the reaction product of a diolefin monoxide and alcohols, amines, mercaptans, or fatty acids. In the former case the copolymer is generally subsequently modified by condensing with an alcohol, amine or mercaptan containing a long chain hydrocarbon containing from eight to twenty-four carbon atoms. In either case the final product is characterized by the presence of at least one long hydrocarbon side chain containing from eight to twenty-four carbon atoms.

Diolefin monoxides such as butadiene monoxide react readily with alcohols, amines, mercaptans, and fatty acids to yield hydroxy ethers, hydroxy amines, hydroxy sulfides, hydroxy esters respectively, generally in accordance with the following formulae:

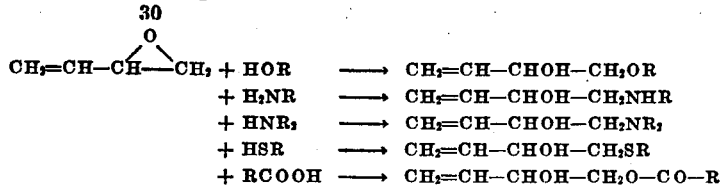

It is possible for the monoxide ring to open in a different fashion to yield

and the like. This is immaterial for the purposes of the present invention, however. These products may be copolymerized directly with an ethylene-1,2-dicarboxylic acid, or they may first be esterified to give the following products:

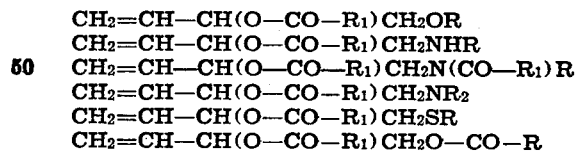

The esterified product may then be copolymerized with the dicarboxylic acid.

If the reactants have been properly chosen, the copolymer is oil soluble. To insure solubility, either R or $R_1$, preferably both, in the above formulae should be an aliphatic radical containing at least 8 carbon atoms. However, it is not necessary that R and $R_1$ be identical in length. On the contrary, they may be different and R and $R_1$ may each stand for a mixture of aliphatic radicals in the desired range.

When the unsaturated dibasic acid is copolymerized directly with the diolefin monoxide, the resulting copolymer is generally reacted with a high molecular weight alcohol, mercaptan, or amine. Unless the initial reactions have been so chosen that at least one straight-chain aliphatic hydrocarbon, containing at least 8 carbon atoms, is present, this essential long-chain hydrocarbon radical is supplied by a modification agent which is generally an alcohol, a mercaptan, or an amine. In the case of a reaction with an alcohol, the resulting product would be made up of units as indicated in the following formula, assuming that in the copolymerization the dibasic acid and the diolefin monoxide enter into the chain alternately:

Mercaptans would yield similar compounds with the OR replaced by SR; with amines, the OR would be replaced by NHR or $NR_2$. Furthermore, there may be mixtures of these groups in the macromolecule.

The dicarboxylic acids which may be employed in the present invention include maleic acid, fumaric acid, mono or dichloro substituted maleic and fumaric acid, mono and diphenyl maleic, benzyl maleic, dibenzyl maleic, ethyl maleic or any similar acids containing a double bond in the chain between the two carboxyl groups. Acids where the double bond has shifted from the 1-2 position, such as itaconic acid may also be used. The necessary chain length may be supplied by reacting the diolefin monoxide with an alcohol, amine, ester, or fatty acid of the proper chain length by esterifying the above reaction product with a long chain alcohol or by esterifying, amidating, or imidating the copolymer of a dibasic acid and a diolefinic monoxide. Any straight or slightly branched chain alcohol, amine, or mercaptan may be used for this purpose. One very suitable commercially-available mixed alcohol suitable for esterification is a product obtained by the hydrogenation of coconut oil. Such a product is sold under the trade name "Lorol" and is a mixture of saturated straight-chain alcohols ranging from 10 to 18 carbon atoms and having a major proportion of lauryl alcohol which has 12 carbon atoms. Other related products are made by separating this material, which may be considered as a crude mixture, into several different fractions having a relatively higher proportion of the higher, lower, or medium constituent thereof. The composition of Lorol per se and related products, "Lorol B" and "Lorol R," is approximately as follows:

|  | Lorol | Lorol B | Lorol R |
|---|---|---|---|
|  | Per cent | Per cent | Per cent |
| $C_{10}$ | 4 | 3 | 1 |
| $C_{12}$ | 55.5 | 46 | 85 |
| $C_{14}$ | 22.5 | 24 | 13 |
| $C_{16}$ | 14 | 10 | 1 |
| $C_{18}$ | 4 | 17 | 1 |

In preparing the copolymer, equimolecular quantities of dibasic acid derivatives and diolefin monoxide or its derivatives are generally used, although the mole ratio of diolefin monoxide to dibasic acid may be increased to two or even to four. Polymerization catalysts may or may not be used. Among the useful catalysts are benzoyl peroxide, tertiarybutyl hydroperoxide, ditertiarybutyl peroxide, cumene peroxide, sunlight, ultraviolet light, sodium, and sodium amalgam. Peroxide catalysts are generally preferred. The reactants are generally charged into a flask with a diluent and a catalyst and are heated to approximately 40 to 150° C., preferably 70 to 100° C., for a period of a few minutes to over 24 hours. A modification agent is generally added with a suitable diluent and a catalyst such as sulfuric acid, phosphoric acid, hydrochloric acid, benzene sulfonic acid, paratoluenesulfonic acid, and the like.

The aliphatic hydrocarbon side chain may be supplied by an initial reaction between a reactant and a diolefin monoxide, followed by copolymerization with the dibasic unsaturated acid.

The products of this invention may be used in lubricating oils, the concentrations ranging from 0.05 to 5% or more, preferably from 0.1% to 0.5% when pour depression is the primary object and in a larger concentration, for example from 0.5 to 10%, when viscosity index improvement is the primary object. The oil base stock in which the copolymers may be used may be not only from the paraffinic oils which require pour depressants but also from naphthenic and mixed lubricating oils which are desired to be improved in viscosity index or blends of various types of oils where substantial improvements in both pour depressants and viscosity index improvement are desired. The copolymers may also be used in greases which contain metal salts or in paraffin wax or waxy compositions or in lighter liquid hydrocarbon products such as diesel fuel base stocks which are often highly paraffinic in nature and require pour depressants or in other light oils such as domestic heating oil base stock, mineral seal oil, refined kerosene, and the like.

In preparing the lubricating oil or other compositions containing the novel copolymers of this invention, one may also add other conventional additives such as dyes, antioxidants, etc., and one may add other types of pour depressants, such as wax naphthalene condensates or wax phenol condensates, as well as other viscosity index improvers, such as, polybutene, polyacrylates, and the like.

The invention will be better understood from a consideration of the following examples:

Example I

A flask was charged with 49 g. of maleic anhydride, 35 g. of butadiene monoxide and 100 ml. of benzene. The mixture was heated to boiling and a solution of 1.5 g. of benzoyl peroxide in 30 ml. of benzene was added in six equal portions at hourly intervals. The mixture became cloudy after the first addition of catalyst and copolymer separated on the wall of the flask during the reaction period. Refluxing was continued for one hour after the last portion of catalyst had been added. Solvent and unreacted monomers were removed by distillation, finally heating to 100° C. at 1-2 mm. pressure. The product, 65 g. was a solid, nearly white in color, rather soft and crumbly. Carbon and hydrogen were determined by combustion analysis.

The results, 57.24% and 4.74% H, indicate that the monomers entered the copolymer at a molar ratio of 1:1.

63 g. of the copolymer, 410 g. of Lorol B alcohol and about 1 g. of p-toluenesulfonic acid were charged to a flask and the mixture was heated at 135–145° C. for 20 hours. The pressure was then reduced to about 20 mm. causing the mixture to reflux. Under these conditions any water of esterification will pass through the air condenser and be lost from the system, thus driving the reaction to completion. The treatment was continued for 16 hours during which time about 10 ml. of water collected in the cold trap. 100 ml. of benzene were added and the mixture was refluxed at atmospheric pressure, using a water trap. An additional 1.5 ml. of water were obtained by this procedure. The product was isolated by heating the mixture to 200° C. at 1–2 mm. pressure, thus removing the excess Lorol B alcohol. The residue, 279 g., was a soft amber colored solid. The product was an active pour depressant as indicated by the following data obtained by dissolving in Test Oils A and B which have the following characteristics. Test Oil A is a solvent extracted Mid-Continent neutral plus 3½% Pennsylvania Bright Stock SAE, Grade 10. Test Oil B is a solvent extracted Mid-Continent neutral, SAE Grade 10. The test oils have neutral pour points of +30° F. and +15° F. respectively.

| Conc. percent | Blends in Lubricating Oils—A. S. T. M. Pour Point, °F. | |
|---|---|---|
| | In Test Oil A | In Test Oil B |
| 0 | +30 | +15 |
| ⅛ | −5 | −15 |
| ¼ | −20 | −20 |
| ½ | −30 | −20 |

Example II

Example I was repeated using the same quantities of reagents except that twice as much butadiene monoxide was used. The copolymer, before esterification, amounted to 98 g. It was a light yellow tough solid. Analysis, 59.98% C., 5.85% H, indicated that the maleic anhydride and butadiene monoxide entered to copolymer at a molar ratio of about 0.55.

95 g. of the copolymer were esterified with Lorol B alcohol as described in Example I. The product, 234 g., was a soft dark amber colored solid. It was blended with the test oils and the following data were obtained:

| Conc. percent | Blends in Lubricating Oils—A. S. T. M. Pour Point, °F. | |
|---|---|---|
| | In Test Oil A | In Test Oil B |
| 0 | +30 | +15 |
| ⅛ | −10 | −15 |
| ¼ | −20 | −20 |
| ½ | −30 | −15 |

In addition to the above, it is intended that butadiene monoxide will be copolymerized with various other acids and anhydrides such as itaconic anhydride, citraconic anhydride, chloromaleic anhydride, aconitic acid, acrylic acid and methacrylic acid. It is also intended that the copolymers of butadiene monoxide be reacted with various mercaptans and amines as well as with alcohols.

What is claimed is:
1. A product consisting essentially of an esterified condensate obtained by subjecting to a temperature of about 40°–150° C., about 1 mol of a compound selected from the class consisting of ethylene-1, 2-dicarboxylic acids, methylene succinic acids, and their anhydrides, and about 1–4 mols of butadiene monoxide wherein the esterification agent is selected from the class consisting of monohydric primary substantially straight chain alcohols, containing from 8–24 carbon atoms.

2. A product consisting essentially of an esterified condensate obtained by subjecting to a temperature of about 40°–150° C., about 1 mol of maleic acid anhydride and about 1–4 mols of butadiene monoxide wherein the esterification agent is a monohydric primary saturated substantially straight chain alcohol having from 8–24 carbon atoms.

3. A product consisting essentially of an esterified condensate obtained by subjecting to a temperature of from about 40–150° C., about 1 mol of maleic anhydride and about 1–4 mols of butadiene monoxide wherein the esterification agent consists of mixed alcohols obtained by the hydrogenation of coconut oil.

4. A lubricating oil composition consisting essentially of a waxy mineral oil and a small but pour depressing amount of a product consisting essentially of an esterified condensate obtained by subjecting to a temperature of about 40–150° C. about 1 mol of a compound selected from the class consisting of ethylene-1, 2-dicarboxylic acids, methylene succinic acids, and their anhydrides, and about 1–4 mols of butadiene monoxide wherein the esterification agent is selected from the class consisting of monohydric primary saturated substantially straight chain alcohols, containing from 8–24 carbon atoms.

5. A lubricating oil composition consisting essentially of a major proportion of a waxy mineral oil and a small but pour depressing amount of a product consisting essentially of an esterified condensate obtained by subjecting to a temperature of about 40–150° C., about 1 mol of maleic anhydride and about 1–4 mols of butadiene monoxide wherein the esterification agent is a primary saturated substantially straight chain alcohol having from 8–24 carbon atoms.

6. A lubricating oil composition consisting essentially of a major proportion of waxy mineral oil and a small but pour depressing amount of a product consisting essentially of an esterified condensate obtained by subjecting to a temperature of about 40–150° C., about 1 mol of maleic anhydride and about 1–4 mols of butadiene monoxide wherein the esterification agent consists of the mixed alcohol obtained by the hydrogenation of coconut oil.

SAMUEL B. LIPPINCOTT.
ALEXANDER H. POPKIN.

REFERENCES CITED

The following references are of record in the file of this patent:

UNITED STATES PATENTS

| Number | Name | Date |
|---|---|---|
| 2,055,456 | Eichwald | Sept. 22, 1936 |
| 2,399,214 | Evans | Apr. 30, 1946 |
| 2,411,029 | De Groote | Nov. 12, 1946 |
| 2,444,328 | Blair | June 29, 1948 |
| 2,504,082 | Neher et al. | Apr. 11, 1950 |